Figure 1:
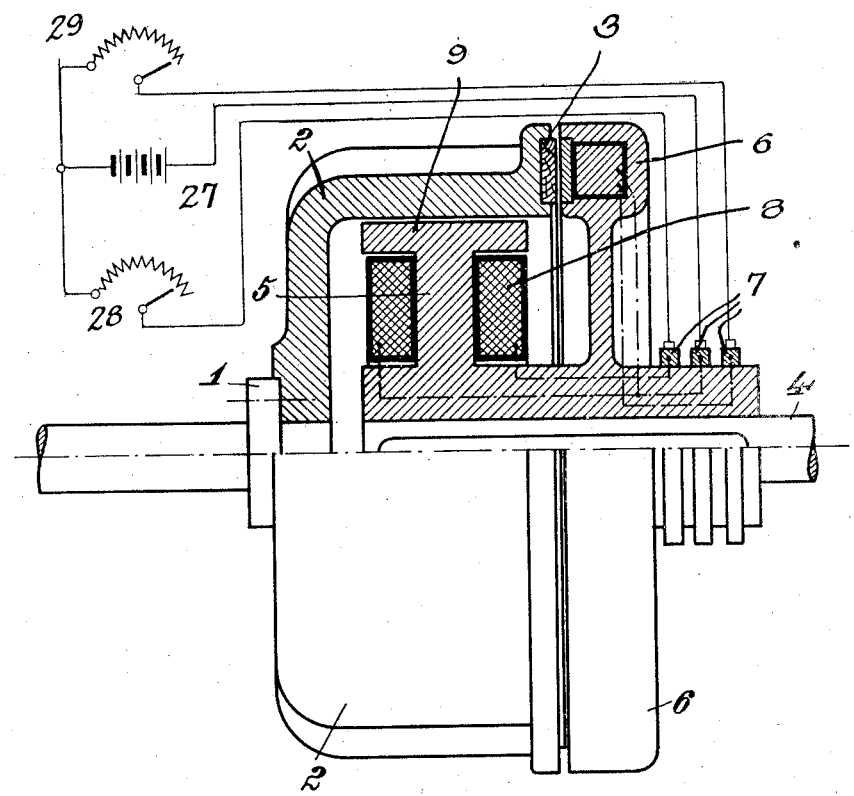

Oct. 6, 1931. J. BING 1,825,934
POWER TRANSMISSION DEVICE
Filed March 22, 1928 4 Sheets-Sheet 2

Inventor:
J. Bing
By: Marks & Clerk
Attys.

Oct. 6, 1931. J. BING 1,825,934
POWER TRANSMISSION DEVICE
Filed March 22, 1928   4 Sheets-Sheet 3
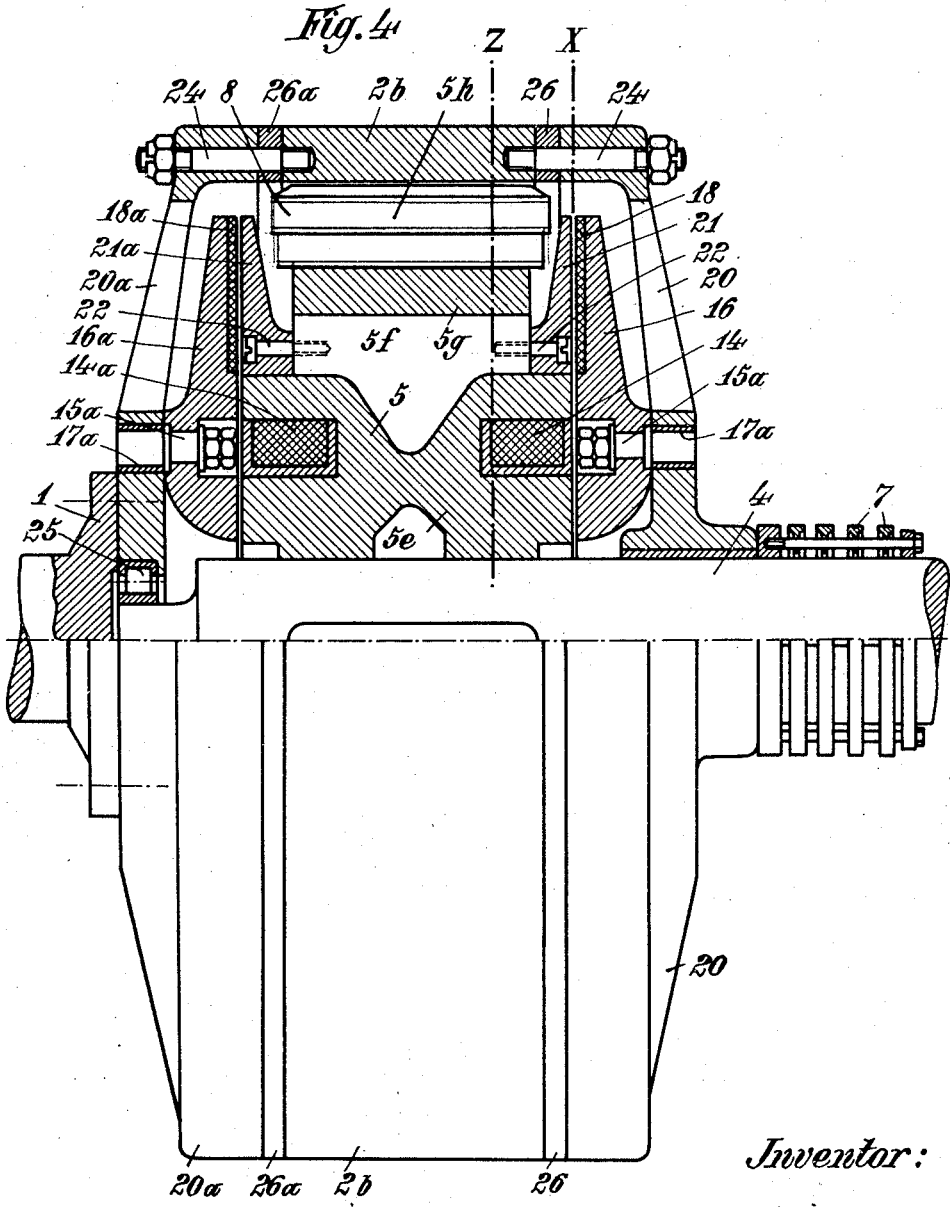

Oct. 6, 1931.  J. BING  1,825,934
POWER TRANSMISSION DEVICE
Filed March 22, 1928    4 Sheets-Sheet 4
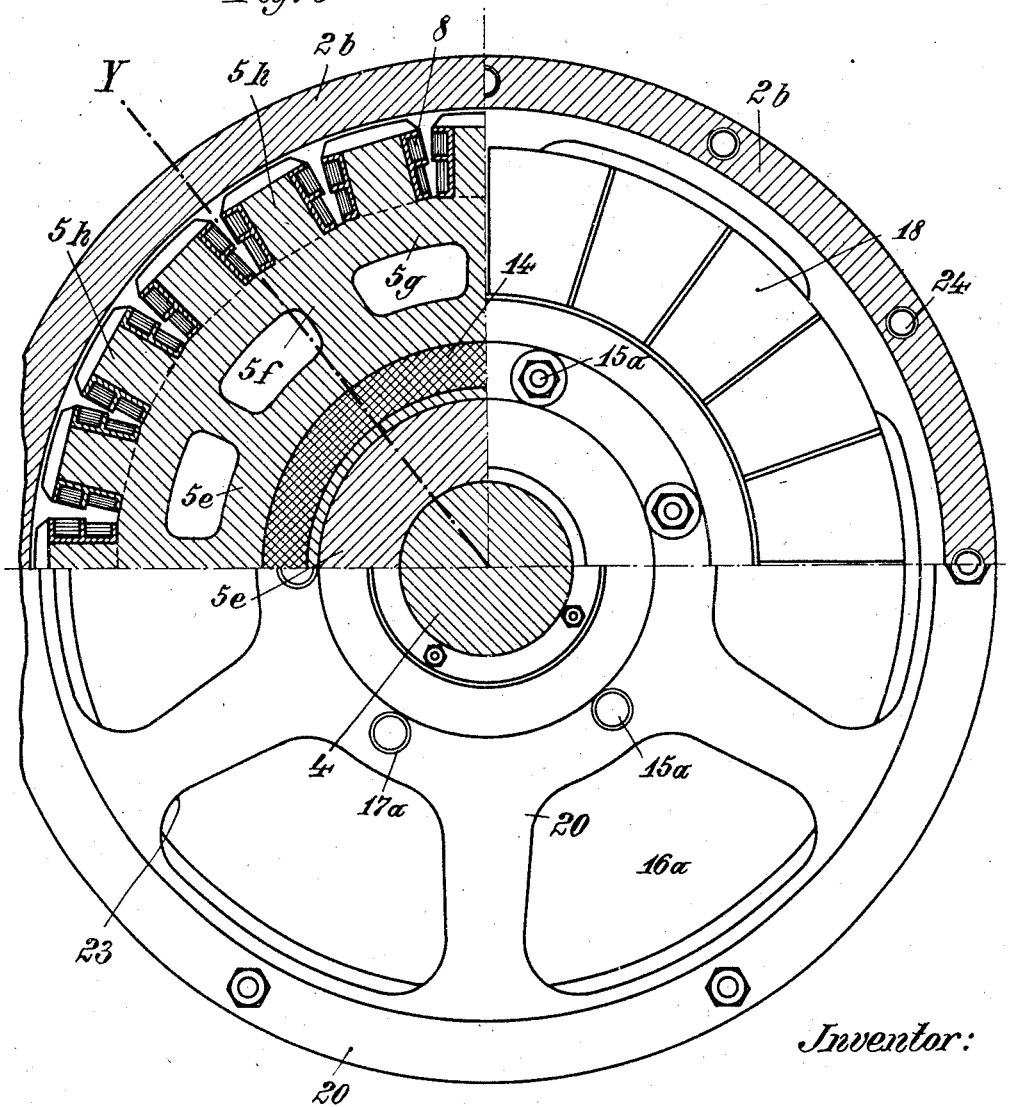
Inventor:
J. Bing
By: Marks & Clerk
Attys.

Patented Oct. 6, 1931

1,825,934

UNITED STATES PATENT OFFICE

JULIUS BING, OF EISENACH, GERMANY, ASSIGNOR TO THE FIRM MAGNET-WERK G. M. B. H. EISENACH SPEZIALFABRIK FUR ELEKTROMAGNET-APPARATE, OF EISENACH, GERMANY

POWER TRANSMISSION DEVICE

Application filed March 22, 1928, Serial No. 263,813, and in Germany March 28, 1927.

This invention relates to power transmission devices, especially of the kind used for transmitting the driving power to the driving wheels of Diesel-locomotives and similar vehicles which are driven by a motor having little adaptability as regards speed and torque characteristics.

When employing power transmission devices of this kind which are ordinarily constructed as friction clutches, the entire work of acceleration which is necessary at the friction surfaces of the clutch must be done during the starting of the locomotive or other vehicle. In consequence of this, a large amount of heat will accumulate at the friction coverings of the clutch and as the friction coverings are mostly made of poor conductors of heat these parts of the clutch will be subject to premature destruction.

These drawbacks may be avoided by relieving the friction clutch of that part of the work of acceleration, which for instance is necessary in order to start the locomotive and the train coupled therewith up to a certain speed of travel, and imposing this work of acceleration upon a special clutch which is combined with said friction-clutch, said special clutch operating on the principle of an eddy-current clutch. If the secondary member of said eddy-current clutch, that is that member in which the eddy-currents are produced, is placed at the outside of the clutch in such a way that it will be permanently in immediate contact with the exterior air, the large amounts of heat developed in said secondary member may be disposed of without any difficulty. By so arranging the secondary member the construction of the entire power transmission device will be of extremely favorable characteristics as regards the disposing of the heat which is generated by the currents in the secondary member of the clutch. In particular, the injurious effects which may be exerted by an excess of temperature upon the friction clutch which is essentially used only for purposes of control may easily be avoided in this manner.

An essential feature of the novel power transmission device according to this invention consists in the first place in the combination of a friction-clutch with an eddy-current clutch, and more especially these two types of clutches are so combined that the secondary member of the eddy-current clutch will form the revolving element thereof so that said secondary member will be immediately in contact with the exterior air. Further improvements according to my invention relate to the specific construction of the combined friction and eddy-current clutch and the proper arrangements of their parts.

Figure 2:
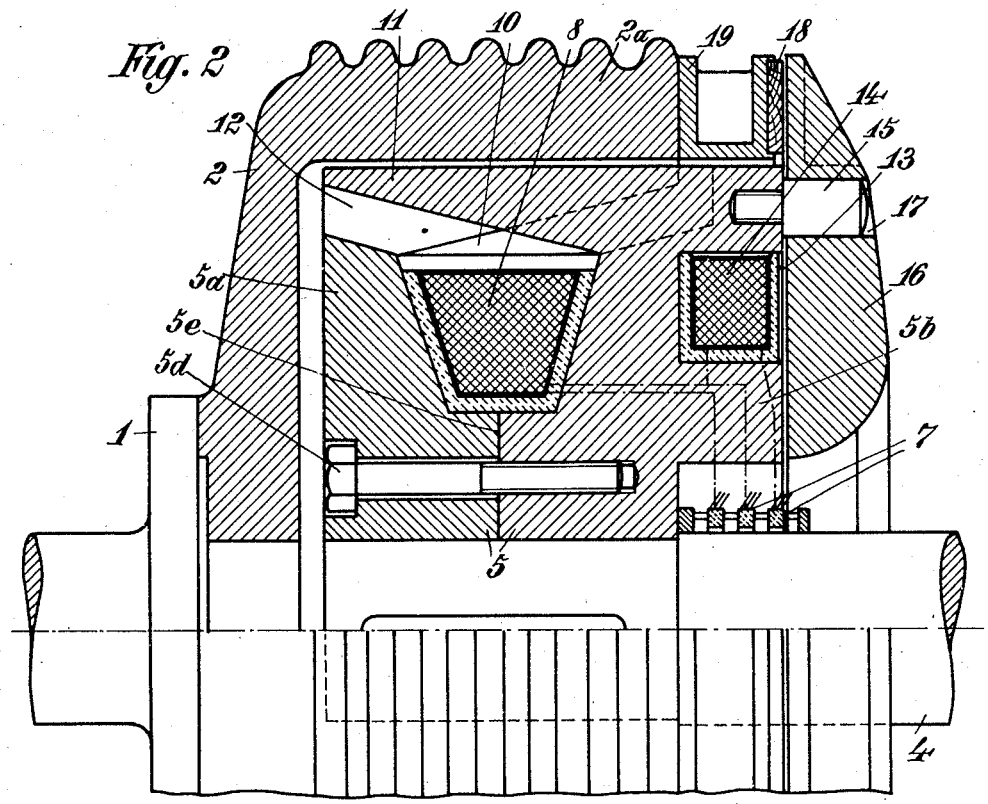
Figure 3:
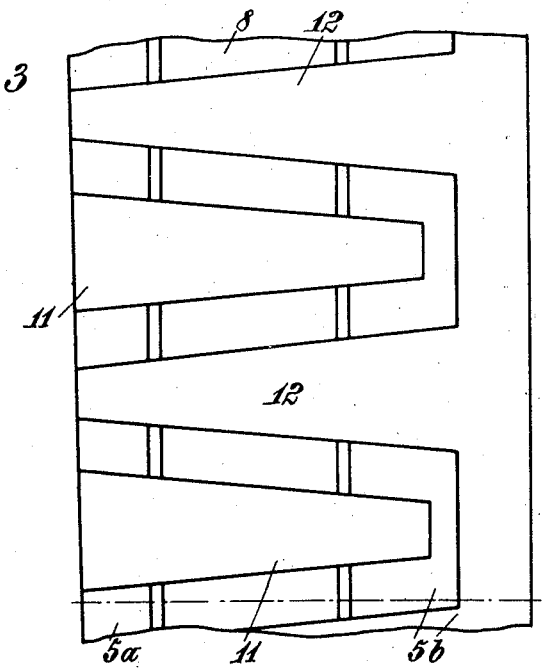

In the accompanying drawings I have shown a number of constructional forms of the power transmission device constructed according to my present invention. Fig. 1 shows one constructional form of the new power transmission device the upper part being an axial section and in the under part a view taken in the direction of the axis of the device, Fig. 2 is a similar enlarged representation of a second constructional form of the power transmission device, the under part being broken away. Fig. 3 shows the interior part or field-body of the power transmission device of Fig. 2 developed out in a plane together with the energizing windings for said interior part or field-body. Fig. 4 shows a further constructional form of the power transmission device in a manner similar to Figs. 1 and 2 the section being taken along the line Y, of Fig. 5, while Fig. 5 in its under part is a lateral view according to Fig. 4, in its upper left-hand quadrant a section according to the line Z of Fig. 4 and in its upper right-hand quadrant a section according to the line X of Fig. 4.

According to Fig. 1 the shaft of the Diesel-motor from which power is transmitted either directly or by means of gears to the driving wheels of the locomotive carries the bell-shaped rotary member 2. This member 2 is keyed to said shaft and in addition to this fastened on the collar or flange 1 of said shaft by means of screws or the like. The rotary member 2 in addition to its function as a secondary member of the eddy-current clutch will also serve as a flywheel. At its free lateral annular surface, the member 2 is provided with a frictional covering 3 which forms part of an electro-magnetically actuated friction-clutch. Within the cylindrical hollow space of the rotary member 2 there is mounted the magnet or field-body 5 of the eddy-current clutch, said magnet or field-body being fixed upon the shaft 4 which transmits power from the motor to the driving wheels of the locomotive. The magnet or field-body 6 of the friction-clutch is rigidly connected with said magnet body 5. The latter consists of a number of pole-bodies which are radially directed and evenly distributed around the hub by means of which the entire magnet or field-body is mounted upon the shaft 4. An energizing coil 8 is mounted on each of said pole-bodies which on their outer ends are provided with pole shoes 9. The outer conformation of said pole shoes is similar to the interior surface of the cylindrical rotary member 2. The individual energizing coils 8 for the pole-bodies of the eddy-current clutch as well as the unitary energizing coil for the magnet 6 of the friction-clutch are supplied with current by way of three slip-rings 7. The connections leading from the slip-rings 7 to the coils which serve for the excitation of the two magnet-systems may be supplied with current independently from each other.

The mode of operation of the power transmission device according to my invention, will now be as follows: The Diesel-motor is started in no load condition in known manner, so that the rotary member 2 which is fixed upon the shaft of said motor will rotate with the latter. In order to actuate the power transmission device, first the magnet-system 5 is energized by means of current of gradually increasing current-strength. Within the secondary member 2 electrical eddy-currents will now be generated in known manner, said eddy-currents causing the magnet-system 5 which is keyed to the shaft 4 to rotate with the member 2. By slowly increasing the current-strength of the energizing current in the coil 8 the speed of rotation of the member 5 which rotates with the member 2 thereof may be caused to attain a maximum value. This maximum speed will depend, as known upon the character of the secondary member 2 as well as upon the character of the magnetic circuits. After the field-body 5 has attained its maximum speed which is determined by the slip of the eddy-current clutch, the friction-clutch, is actuated. By reason of the friction at the frictional covering 3, the member 2 will now be rigidly coupled with the member 5, so that no further production of eddy-currents in the member 2 will take place after the friction-clutch has come into its proper operating condition. The energizing coils 8 serving for the actuation of the eddy-current clutch may now be switched out of circuit.

The friction members of the electro-magnetically actuated friction-clutch, therefore, will have to overcome only a relatively small difference of velocity existing between the Diesel-motor and the locomotive or other vehicle after starting. The work which must be done for this purpose, however, amounts to only a small fraction of the total work required for the acceleration. In consequence thereof the strain imposed upon the friction surfaces of the friction-clutch will only be small so that the said clutch will remain in relatively cool condition during operation. The friction-clutch may therefore be made of relatively very small size. In this manner the safety of operation of the entire power transmission device is essentially enhanced and an exchange of the frictional coverings of the friction-clutch is only necessary at large intervals of time. The greatest part of the power necessary to start the locomotive or other vehicle will therefore be transformed into Joule's heat which is generated by eddy-currents flowing within the secondary member 2 of the eddy-current clutch. On account of its large mass the secondary member 2 of the eddy-current clutch may easily take up large quantities of heat without assuming an impermissible temperature. A regulation of the power necessary for starting the locomotive by means of the eddy-current clutch may be accomplished by well known means, such as for instance by varying the current-strength of the energizing current, or by varying the number of poles of the field-body of said clutch or also by changing the pole-pitch of said field, or by a combination of all these means. The specific construction of the secondary member 2 which serves for the reception of the eddy-currents is of no importance, as far as this invention is concerned. If desired a special or additional secondary member may be provided for the reception of the eddy-currents. Furthermore, the heat which is generated within the secondary member by action of the eddy-currents may be dissipated in an electrical resistance especially provided for this purpose. In addition to this said resistance may be used for purposes of speed regulation. Instead of an electro-magnetically actuated friction-clutch which is the preferred type of friction-clutch for the present purpose also a friction-clutch of any other construction may be combined with the eddy-current clutch.

According to Figs. 2 and 3 the secondary member of the eddy-current clutch consists likewise of a bell-shaped hollow body 2 connected to the collar or flange 1 of the shaft of the Diesel-motor. This body 2 again serves as a fly wheel and at the same time for the reception of the eddy-currents which in this case are generated within the outer cylindrical part 2a of said bell-shaped hollow body.

In order to facilitate radiation of heat from the secondary member 2a, the latter is preferably provided with ribs or the like on its outer surface in the manner of a radiator. Within the secondary member 2 of the eddy-current clutch there is provided the field-body 5 which as a whole is of the form of a cylinder. The field-body 5 is firmly keyed to the driven shaft 4 and consists essentially of two parts 5a and 5b which contact with each other along a surface 5e positioned perpendicularly to the axis of the device. The two parts 5a and 5b are connected with each other by means of the screw-bolts 5d. Intermediate the parts 5a and 5b there is provided a hollow space 10 of ring-shaped conformation serving for the reception of the energizing coil 8 which is concentrically positioned with respect to the axis of the device. The coil 8 is supplied with energizing current by way of the slip-rings 7. The two parts 5a and 5b of the field-body 5 are each provided with pole-shoes 11 and 12 which alternately overlap the hollow space 10 and the energizing coil 8 therein, as indicated in Fig. 3. In axial direction said pole-shoes extend essentially over the entire width of the interior cylindrical surface of the secondary member 2 forming part of the eddy-current clutch.

The field-body 5 is further provided on its right-hand lateral surface with an annular recess 13 which serves for the reception of the energizing coil 14 for the friction-clutch. The coils 14 and 8 are supplied with current by way of the slip-rings 7 in a manner similar to Fig. 1. Bolts 15 are screwed into the respective lateral surfaces of the field-body 5, said bolts serving to guide the armature disc 16 and extending into bores 17 provided in said disc. The friction-ring 18 which comes in frictional engagement with the peripheral parts of the interior surface of the armature disc 16, when throwing-in the friction clutch, is mounted on a special ring-shaped intermediate member 19 which is made of non-magnetizable material. In addition to this, the intermediate member 19 is fixed upon the lateral surface of the cylindrical part 2a of the secondary member 2 of the eddy-current clutch. A non-magnetizable material is used for said intermediate member 19 for the purpose of preventing the magnetic lines which generate the magnetic field for the eddy-current clutch from passing into the armature disc 16. Preferably, radially directed ribs may be arranged on the member 19, said ribs facilitating radiation of the heat developed in said member.

The mode of operation of the power transmission device just described is essentially in accordance with the mode of operation of the device shown in Fig. 1. Upon actuation of the eddy-current clutch, the field-body 5 thereof will readily attain its maximum speed of rotation. Now the coil 14 is energized which will cause the armature disc 16 to come in engagement with the friction coverings 18 and 19 so that the two shafts will now be coupled with each other by means of the friction-clutch. At this time the current which serves for energizing the eddy-current clutch may now be interrupted.

The poles of the field-body as shown in Fig. 2 may also be constructed in a different manner. It is only essential to choose the number of poles as large as possible without, however, requiring individual energizing coils for each pole, and to produce the magnetic flux required for the generation of the eddy-currents as well as for the actuation of the friction-clutch within a unitary magnet or field-body.

According to Figs. 4 and 5 the secondary member of the eddy-current clutch consists of a ring 2b which is fixed on its left-hand side by the aid of an intermediary shield 20a to the flange or collar 1 of the motor shaft, while on the right-hand side said ring is mounted by means of an intermediary shield 20 upon the driven shaft 4. A member 5 of cast steel is further keyed to said shaft 4, said member 5 consisting of an interior hub-like part 5e forming the field-body of the friction-clutch and of an exterior rim 5g connected with the former by means of radially directed arms 5f. The pole-bodies 5h are mounted radially on said rim 5g. The entire magnet or field-body of the friction-clutch will therefore consist of a unitary body of cast-steel which, as may be seen from Fig. 4, is only to such an extent of solid construction as required in order to provide a proper path for the magnetic lines of force developed by the energizing coils. The energizing coils 14 and 14a of the friction-clutch are mounted within annular recesses on the lateral surfaces of the magnet or field-body 5, while the energizing coils 8 of the eddy-current clutch are mounted upon the pole-body 5h. Rings 21 and 21a are mounted upon both ends of the hub 5e which projects out of the field-body in axial direction thereof. Said rings 21 and 21a are firmly connected with the arms of the field-body by means of the screws 22 and form an abutment for the frictional coverings 18 and 18a which are mounted upon the interior surface of the armatures 16 and 16a appertaining to the magnets or field-bodies forming part of the friction-clutches. These armatures are made in the form of annular discs which are guided displaceably in axial direction on the bearing shields 20 and 20a by the aid of bolts 15 and 15a. For this purpose the bolts 15 and 15a project into sleeves 17a mounted in bores of the shields 20 and 20a. The bearing shields, as may particularly be seen from Fig. 5, are provided with large openings 23 in order to provide a facility of cooling. One of said shields 20, as above-mentioned, is mounted upon the appertaining shaft 4, while the other shield 20a comprises a roller-bearing 25 which rests upon the end of the shaft 4. On the outside the bearing shields 20 and 20a are connected with the annular body 2b of iron by means of bolts 24 and by intermediate rings 26 and 26a which are made of an electrically conducting material such as copper. Eddy-currents will be formed in the ring 20 during rotation of the magnet or field-body, said eddy-currents being necessary for transmitting torque from one to the other member of the eddy-current clutch. In the electrically conducting rings 26 and 26a apparently powerful eddy-currents will be generated. These rings perform the function of the lateral rings which are usually provided in cage-windings of short-circuited rotors of induction-motors. Current is supplied to the several energizing coils by the aid of slip-rings 7 provided on the shaft 4.

In order to operate the power transmission device according to my invention, first the energizing current for the eddy-current clutch is switched-in as above described and the shaft 4, will now assume its maximum speed of rotation. There will now more or less be a slip between the speeds of the two shafts, said slip depending upon the specific construction of the secondary member of the eddy-current clutch and upon the field-strength of its magnet or field-body. After the shaft 4 has attained its maximum speed, the energizing circuit for the friction-clutches is actuated, which will cause attraction of the armatures 16 and 16a thus engaging the frictional surfaces 18 and 18a with the co-operating frictional surfaces 21 and 21a provided on the field-body 5. The torque transmitted by the eddy-current clutch will now be augmented by the torque produced by the friction-clutches. In consequence of this, the driven shaft 4 will be further accelerated until a slip will no more take place between the two frictional surfaces of the friction clutches. The energizing circuit for the eddy-current clutch may now be interrupted. As the slip between the frictional surfaces 18 and 21 is only small during throwing-in the friction-clutches, the work of friction produced will likewise be small so that the wear and tear of the frictional surfaces as well as the heat developed by friction will be reduced to a minimum. The small quantity of heat produced by the work of friction may easily be disposed of through the openings 23 in the bearing shields by properly providing ribs, cooling channels or the like on the respective bodies which serve for the reception of work of friction. By arranging the power transmission in the manner described as a combination of an eddy-current clutch and an electro-magnetically actuated friction-clutch the conditions of cooling the power transmission device as a whole will be extremely favorable and the space required for said device will be reduced to a minimum. The frictional surfaces, therefore, may be subjected to very large strains, and consequently be made of a relatively small effective radius. There will be no difficulties to dispose of the heat generated within the secondary member 2b of the eddy-current clutch, this being mainly due to the fact, that the secondary member of said clutch is exposed on its entire outer circumference to the exterior air. The wear and tear of the secondary member of the eddy-current clutch apparently is reduced to zero independently of the length of time during which the eddy-current clutch is kept in operation.

The eddy-current magnet and the the magnet for the friction clutch may be controlled in any conventional way as is shown for instance in Fig. 1 The terminal common to the eddy-current magnet 8 and the friction-clutch magnet 6 leads to the intermediate contact ring 7; the other terminal of magnet 8 leads to the left and the other terminal of clutch magnet 6 leads to the right hand contact ring 7. Current is supplied by the current source 27 to the contact rings by means of brushes. There is a resistance 28 in the circuit of the eddy-current magnet 8 and another resistance 29 in the circuit of the clutch magnet 6. By slowly cutting out in the usual way at first the resistance 28 clutching by eddy-current becomes effective and then by cutting out the resistance 29 the friction-clutch is operated electromagnetically. The switch for the resistance 28 may then be returned to its home or interrupting position while the switch for the resistance 29 remains in its lower position to maintain frictional coupling.

I claim:

1. A power transmission device, especially for Diesel-motor locomotives, comprising in combination, an eddy-current-clutch, an electro-magnetically operative friction clutch, energizing coils for actuating said clutches and being positioned within the field-body of the eddy-current clutch, a cylindrical casing enclosing said energizing coils, bearing shields mounted on either end of said casing, and armatures guided in said bearing shields.

2. A power transmission device, especially for Diesel-motor locomotives, comprising in combination, an eddy-current clutch, having a field-body, an electro-magnetically operative friction-clutch, energizing coils for actuating both said eddy-current and said friction clutch, said coils being positioned within said field-body, a cylindrical casing enclosing said field-body, bearing shields mounted on the ends of said casing, and an armature disc adapted to engage said field-body, said armature disc being axially guided in said bearing shields.

In testimony whereof I affix my signature.

JULIUS BING.